(12) United States Patent
Haskara et al.

(10) Patent No.: US 8,306,723 B2
(45) Date of Patent: Nov. 6, 2012

(54) METHOD TO CONTROL FUEL INJECTOR PULSEWIDTH IN A COMPRESSION-IGNITION ENGINE

(75) Inventors: Ibrahim Haskara, Macomb, MI (US); Yue-Yun Wang, Troy, MI (US); Chol-Bum M Kweon, Rochester, MI (US); Zhiping Liu, Canton, MI (US); Frederic Anton Matekunas, Troy, MI (US); Paul Anthony Battiston, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 180 days.

(21) Appl. No.: 12/248,310

(22) Filed: Oct. 9, 2008

(65) Prior Publication Data

US 2010/0089362 A1    Apr. 15, 2010

(51) Int. Cl.
G06F 19/00 (2011.01)
G06G 7/70 (2006.01)
F02M 51/00 (2006.01)

(52) U.S. Cl. ........ 701/114; 701/112; 701/110; 701/115; 701/104; 123/435; 123/436; 123/478; 123/486; 123/493; 123/481

(58) Field of Classification Search .............. 123/435, 123/436, 486, 493, 299, 300, 198 F, 198 DB; 701/103, 104, 110, 111, 112
See application file for complete search history.

(56) References Cited

U.S. PATENT DOCUMENTS

| | | | |
|---|---|---|---|
| 6,354,264 B1 | 3/2002 | Iwakiri et al. | |
| 6,964,261 B2* | 11/2005 | Warne et al. | 123/436 |
| 6,994,077 B2 | 2/2006 | Kobayashi et al. | |
| 7,325,529 B2 | 2/2008 | Ancimer et al. | |
| 7,522,987 B2* | 4/2009 | Fujii | 701/104 |
| 2004/0267433 A1 | 12/2004 | Asano et al. | 701/104 |
| 2005/0161026 A1* | 7/2005 | Mattes | 123/486 |
| 2007/0251507 A1* | 11/2007 | Mueller et al. | 123/493 |
| 2008/0077306 A1* | 3/2008 | Kloppenburg et al. | 701/104 |
| 2009/0063018 A1* | 3/2009 | Takeuchi et al. | 701/104 |

FOREIGN PATENT DOCUMENTS

CN    1576549 A    2/2005
CN    101413447 A    4/2009

* cited by examiner

Primary Examiner — Willis R Wolfe, Jr.
Assistant Examiner — Anthony L Bacon

(57) ABSTRACT

A direct-injection, compression-ignition internal combustion engine control adapts nominal minimum pulsewidth parameters controlling the fuel injectors to minimize pilot fuel delivered to the cylinders required to initiate a preliminary combustion event.

8 Claims, 7 Drawing Sheets

METHOD TO CONTROL FUEL INJECTOR PULSEWIDTH IN A COMPRESSION-IGNITION ENGINE

TECHNICAL FIELD

This disclosure relates to a procedure involving control and balancing of fuel injectors in direct-injection, compression-ignition, internal combustion engines utilizing high pressure common rail fuel injection systems.

BACKGROUND

The statements in this section merely provide background information related to the present disclosure and may not constitute prior art.

Electronic Fuel Injection is the primary method of fuel distribution in compression-ignition and spark-ignition internal combustion engines. A fuel injector is a solenoid-actuated or piezo-electric valve device mounted on an engine and positioned to deliver pressurized fuel to a combustion chamber of an engine cylinder. Each injector is preferably energized each combustion cycle for a period of time, or pulsewidth, determined based upon pre-calibrated parameters for engine operating conditions. Multiple fuel injection events can occur each combustion cycle for each cylinder, including a main fuel injection event preceded by a pilot injection event to stabilize combustion, minimize combustion noise and increase fuel efficiency.

Pilot injection fuel mass is small in relation to the mass of fuel metered out for the main fuel injection event. Pilot injection fuel mass can be difficult for the fuel injection system to deliver in terms of precision and consistency. Injecting a fuel mass that is too small fails to initiate a pilot injection event, resulting in a missed pilot combustion event. A missed pilot injection event can lead to increased combustion noise and deterioration of emissions performance. To prevent a missed pilot injection event, engine control systems can be calibrated offline. This approach can lead to a pilot injection fuel mass that is greater than a minimum required pilot mass to induce pilot combustion.

SUMMARY

A direct-injection compression ignition multi-cylinder internal combustion engine is operated under a predetermined condition. Fuel pressure is controlled to a predetermined pressure level. A fuel injector for a first cylinder is actuated during each cylinder event at pulsewidths adjusted from a nominal minimum pulsewidth. A combustion parameter for the first cylinder is monitored, and a discernable change in the state of the combustion parameter and the corresponding pulsewidth are detected. The nominal minimum pulsewidth is adjusted to the pulsewidth corresponding to the discernable change in the state of the combustion parameter.

BRIEF DESCRIPTION OF THE DRAWINGS

One or more embodiments will now be described, by way of example, with reference to the accompanying drawings, in which.

DETAILED DESCRIPTION

Figure 1:
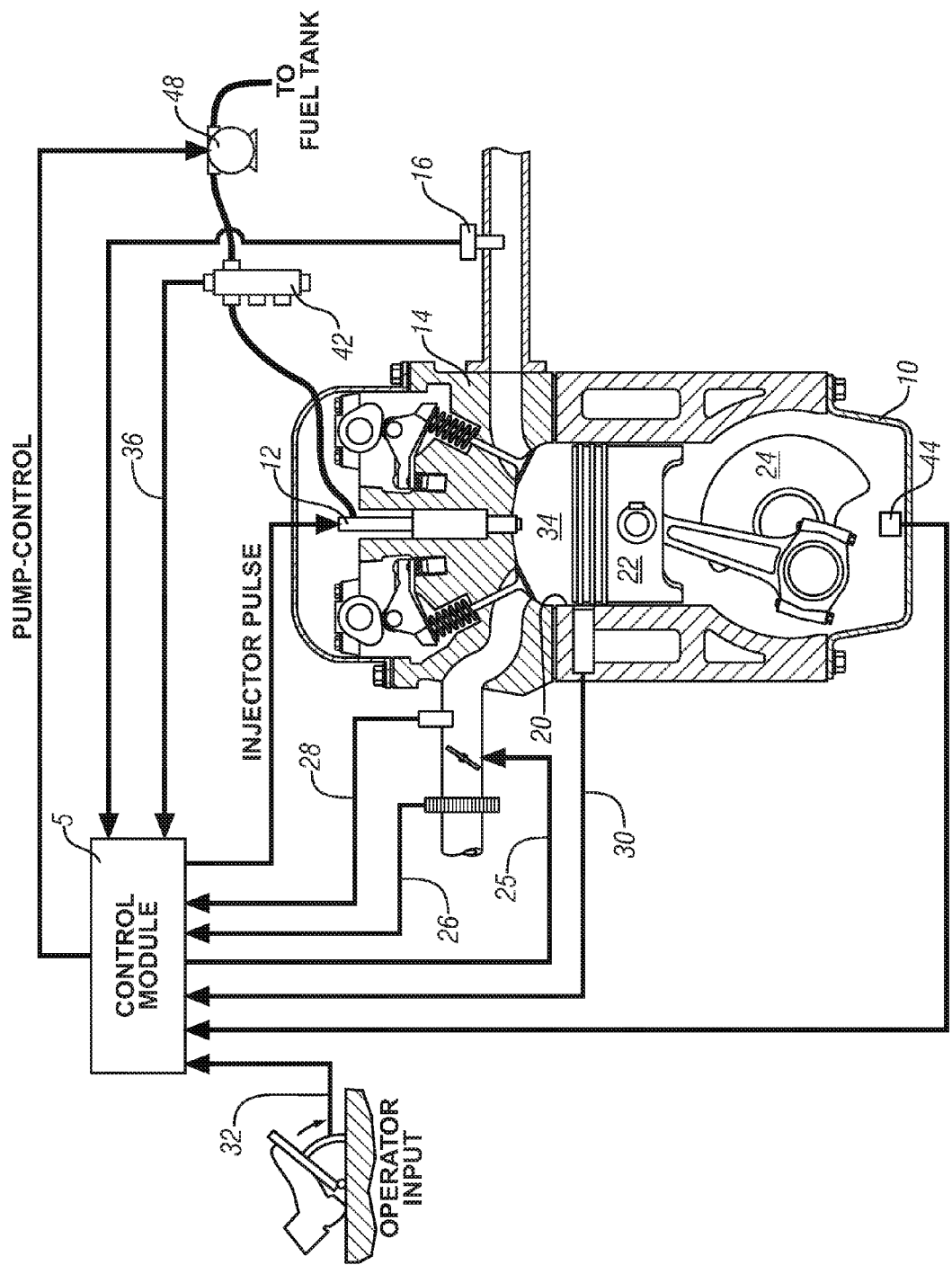
FIG. 1 is a schematic diagram of an exemplary compression-ignition engine with a high pressure common rail fuel injection system and engine control architecture in accordance with the present disclosure.

Referring now to the drawings, wherein the showings are for the purpose of illustrating certain exemplary embodiments only and not for the purpose of limiting the same, FIG. 1 schematically depicts an internal combustion engine 10, a high pressure common rail injection system, and an engine control system which are in accordance with an embodiment of the present disclosure.

The exemplary engine 10 comprises a direct-injection, compression-ignition, internal combustion engine employing a four-stroke operation wherein each combustion cycle comprises 720 degrees of angular rotation of a crankshaft 24 divided into four 180-degree stages of intake-compression-expansion-exhaust, which are descriptive of reciprocating movement of a piston 22 in each engine cylinder 20, which form a variable volume combustion chamber 34 with an engine head 14. The engine combustion cycle is fueled through a high pressure common rail fuel injection system. The high pressure common rail fuel injection system includes a fuel supply pump 48, which feeds fuel from a fuel tank (not shown) to a common fuel rail 42. A pressure regulator valve (not shown) can be integrated into the common fuel rail 42. Control module 5 regulates the fuel rail pressure by actuating the fuel supply pump 48 with command signals ('PUMP-CONTROL') in response to feedback from an internal rail pressure sensor 36. Fuel lines branch off from the common fuel rail 42 and connect to a plurality of individual cylinder fuel injectors, one of which is shown as injector 12.

The injector 12 preferably comprises a solenoid-actuated valve that delivers fuel into the cylinder 20 through a high pressure nozzle. The amount of fuel injected is directly proportional to the amount of time the solenoid is energized, within a linear range of the injector. Injector energizing time is commonly referred to as an injector pulsewidth that can be measured in milliseconds. A pilot injection event can occur when the control module 5 actuates the injector 12 to deliver fuel to the combustion chamber 34 prior to a main injection event. A preferred pilot injection event includes actuating the injector 12 for a minimum effective pulsewidth to deliver a minimum sufficient mass of fuel to the combustion chamber 34 to initiate a preliminary combustion event. The minimum effective pulsewidth is referred to as a nominal minimum pulsewidth. Nominal minimum pulsewidths can be determined in offline calculations for ranges of engine operating conditions and stored in look-up tables in memory devices (not separately shown) within the control module 5. The look-up tables are collectively herein referred to as an Injector Map. During engine operation the control module 5 selects the nominal minimum pulsewidth from the Injector Map based upon the engine operating conditions for energizing the injector 12. Nominal minimum pulsewidth calculations take into account an array of factors so that the control module 5 can effectively respond to engine operating conditions. The engine operating conditions considered in determining the nominal minimum pulsewidth preferably include air mass entering the engine 10, amount of oxygen in the exhaust, the operator torque request, coolant temperature, ambient temperature, control system voltage, manifold pressure, and engine speed.

The reciprocating pistons 22 are attached to the crankshaft 24, which can be attached to a vehicle transmission and driveline (not shown) to transmit tractive torque thereto. During ongoing operation of the engine 10, a combustion event occurs during each engine cycle when fuel is injected into the combustion chamber 34 during the compression stroke, leading to ignition of the injected fuel.

In-cylinder burned gases are generated due to combustion of the fuel and air mixture, which become exhaust gases when passed out of the combustion chamber 34 with opening of engine exhaust valves (not separately labeled). The engine 10 includes sensing devices to monitor engine operation, and actuators which control engine operation. The sensing devices and actuators are signally and operatively connected to the control module 5. The sensing devices are installed on or near the engine 10 to monitor physical characteristics and generate signals which are correlatable to engine and ambient parameters. The sensing devices preferably comprise a crank sensor 44 for monitoring crankshaft speed, a manifold pressure sensor 28 for monitoring manifold pressure and ambient pressure, a mass air flow sensor 26 for monitoring intake mass air flow and intake air temperature, an exhaust gas sensor 16, and a cylinder sensor 30 for monitoring the state of a combustion parameter for each cylinder 20. In practice the cylinder sensor 30 can monitor one of pressure, temperature, or ionization within each cylinder 20 during combustion. Each of the sensing devices is signally connected to the control module 5 to provide signal information which is transformed by the control module 5 to information representative of the respective monitored combustion parameter. Engine actuators can include an electronically controlled throttle device 25 operative to control intake airflow to the engine 10. It is understood that this configuration is illustrative, not restrictive, including the various sensing devices being replaceable within functionally equivalent devices and algorithms.

Various combustion parameters can be monitored by the engine sensing devices to detect an onset of combustion, which can be used to detect a preliminary combustion event, or pilot combustion, that can be associated with a pilot injection event. Combustion parameters can include in-cylinder pressure, heat released during combustion, flame ionization, and crankshaft rotation speed. When too little fuel is injected, pilot combustion does not occur and the combustion parameter responds in a suppressed, non-linear, and inconsistent manner. This state of cylinder operation is considered a "dead zone" where little if any work is performed and fuel efficiency is low. When a sufficient mass of fuel is injected for the engine operating conditions, i.e., rail pressure, operator torque request, ambient temperature and engine speed, a discernable change in the state of the combustion parameter will occur. The combustion parameter being monitored immediately responds in a manner characteristic of onset of combustion. Characteristically responsive combustion corresponding to a discernable change in the state of the combustion parameter includes an increased work output from the engine 10, a definite linear relation between the combustion parameter and time, and a predictable, repeatable combustive response.

Figure 3:
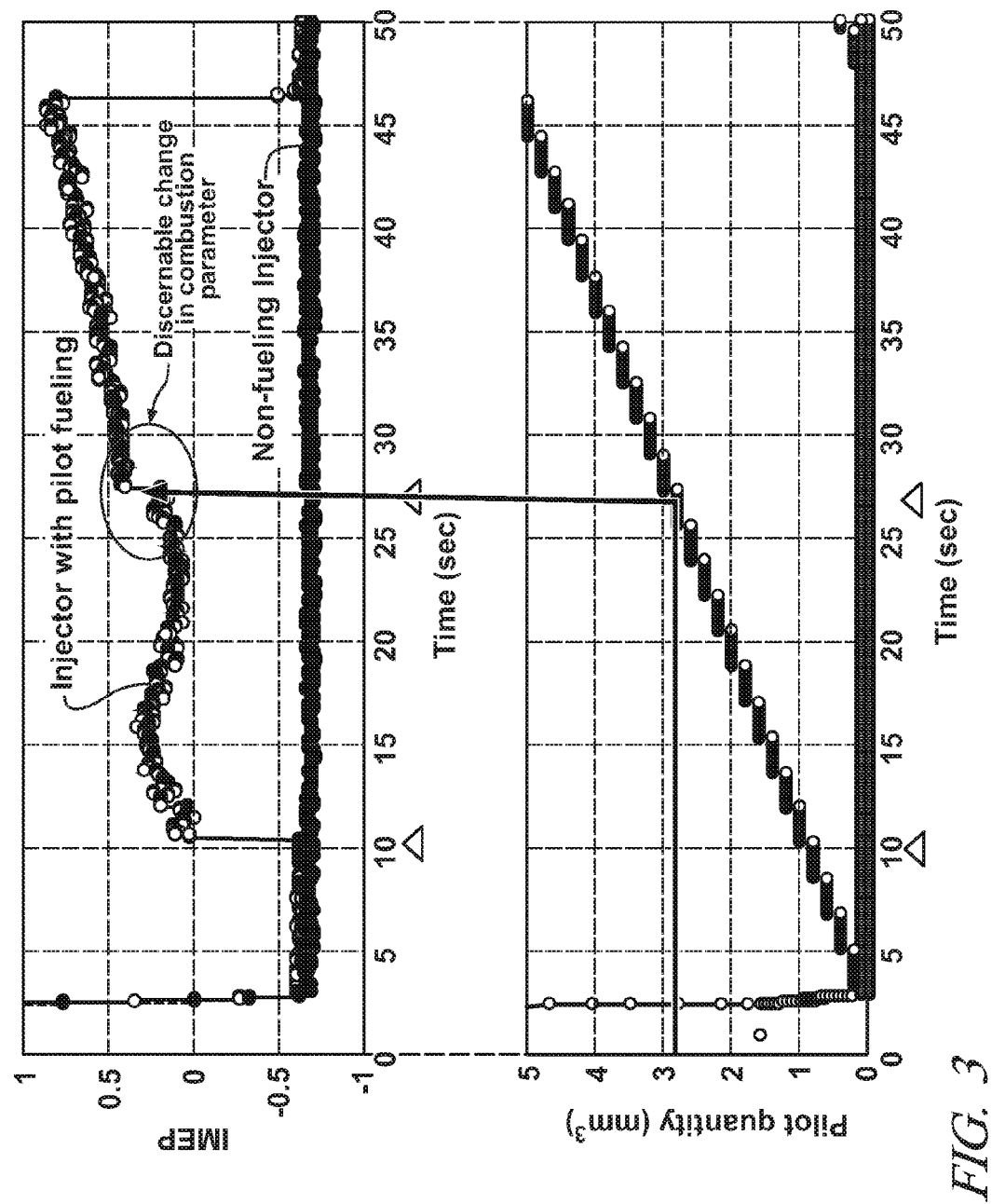
FIGS. 3 and 4 show data graph results illustrating the engine of FIG. 1 controlled according to the method of FIG. 2 in accordance with the present disclosure.
Figure 4:
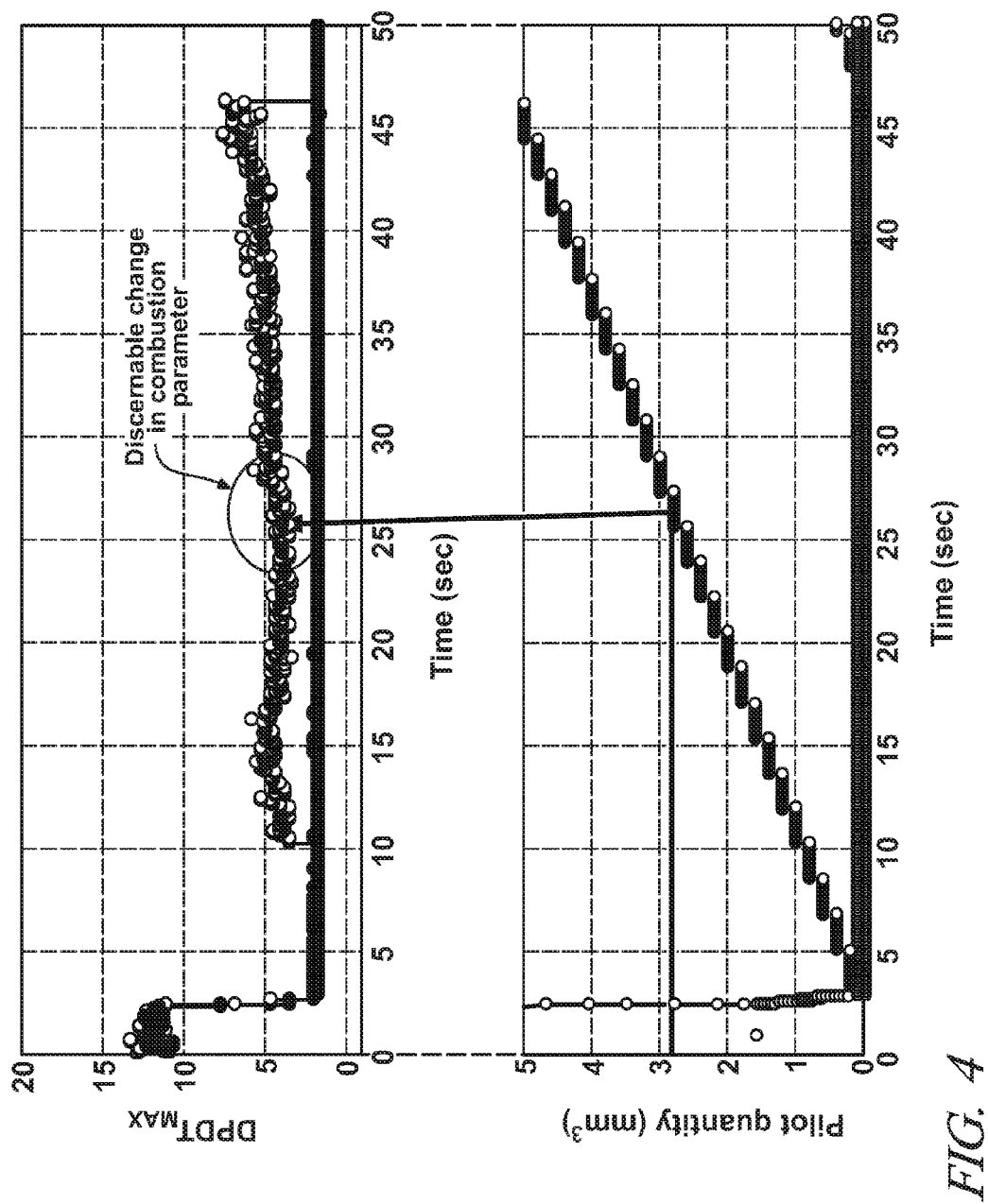

FIG. 3 shows measured Indicated-Mean-Effective-Pressure (hereafter 'IMEP') with increasing pilot fuel quantity in [$mm^3$] over time in seconds. This graphical representation shows how IMEP can be utilized as a monitored combustion parameter. There is a non-linear "dead zone" in a cylinder absent successful combustion. As the pilot fuel quantity increases, onset of combustion can be discerned when a sufficient mass of fuel is injected into the cylinder 20, which in this case occurred at the 27 second mark. FIG. 4 shows other pressure parameters behaving similarly. A combustion parameter comprising a Maximum Pressure Rise Rate ('DP-DTmax') is shown, with the pilot fuel quantity in volume ($mm^3$) increasing over time, including identifying the dead zone and the linear range for onset of combustion. Other combustion parameters that can be used include, for example, Location of Maximum Pressure Rise Rate, Pressure Ratio Difference Average, and other in-cylinder pressure-related combustion parameters which can be determined by analyzing signals output from the combustion sensor 30.

Prior to the main fuel injection and subsequent combustion, the injector 12 can execute the pilot injection event to deliver the pilot fuel into the cylinder 20 to initiate the preliminary combustion event, or the pilot combustion, during each combustion cycle. The preliminary combustion event prevents cylinder pressure from rising quickly when the main fuel injection event occurs. The resulting reduction in the pressure gradient provides a less noisy combustion process. One having ordinary skill in the art will also recognize that collaborative calibration of the pilot and main injection events can retard timing of the main injection event, which reduces cylinder pressure and gas temperature in the region where NOx formation rate is highest, thereby reducing NOx formation.

Figure 2:
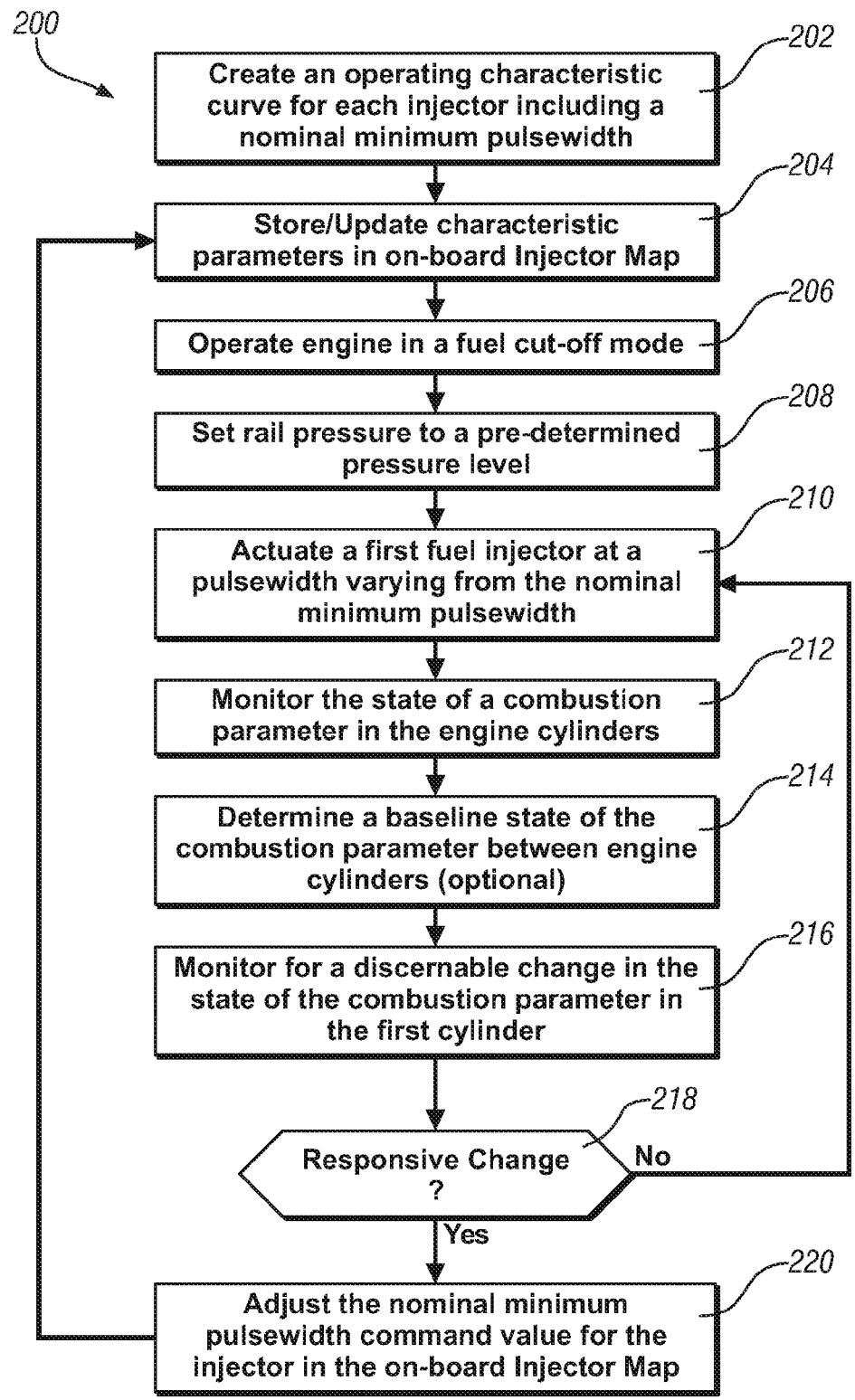
FIG. 2 is a flow diagram depicting a method for adapting minimum injector pulsewidth for cylinder fueling during engine fuel cut-off mode in accordance with the present disclosure.

FIG. 2 shows a flowchart 200 of a first embodiment to control injector pulsewidth and thus injected fuel quantity for each injector 12 through combustion monitoring, onboard learning and adaptive algorithms, and updating nominal minimum pulsewidth parameters during ongoing engine operation. An operating characteristic curve is calculated for each injector 12 on the engine 10, including nominal minimum pulsewidth values for a plurality of engine operating conditions (202). The calculated characteristic parameters are stored in the Injector Map (204). This is an intrusive operation performed while the engine 10 is operating in an overrun mode (206). Overrun mode occurs when the cylinders are not being fueled to power the vehicle, but are in a coastdown mode such as when decelerating to a stop or coasting down a grade in the road. Overrun mode is also termed as a fuel cut-off mode, or DFCO mode (for 'Decel Fuel Cut Off'). During this mode of operation the control module 5 controls fuel pump 48 to set and maintain a pre-determined level of pressure in the common fuel rail 42. Once a consistent pressure level is attained (208) the nominal minimum pulsewidth parameter for the selected rail pressure is extracted from the Injector Map and a Command Pulsewidth is generated by iteratively varying the nominal minimum pulsewidth from its stored value by either incrementing it slightly above or decrementing it slightly below the nominal value (210). The Command Pulsewidth actuates each injector 12 during the fuel cut-off mode. After actuation of each injector 12, the state of a combustion parameter within the injected cylinder 20 is monitored (212) via the combustion sensor 30 to determine if the energizing time of the Command Pulsewidth has delivered an adequate amount of fuel to initiate a preliminary combustion event. When a discernable change in the combustion parameter is identified a preliminary combustion event has occurred.

If a characteristically responsive change in the combustion parameter is not detected (218) after actuating the injector 12 with the Command Pulsewidth then it is determined that a preliminary combustion event has not occurred. The nominal minimum pulsewidth for the set rail pressure is varied again (210) and the injector 12 is actuated with the new Command Pulsewidth based on the varied nominal value. The state of the combustion parameter is monitored again (212) to determine if a preliminary combustion event has occurred. This process of varying the nominal minimum pulsewidth and actuating the injector 12 with a Command Pulsewidth during the fuel cut-off mode is designated an Injection Command Sweep and it repeats until a preliminary combustion event is detected by a discernable change in the monitored combustion parameter, i.e., a characteristically responsive change in the combustion parameter indicating onset of combustion (216). The Injection Command Sweep can include setting the Command Pulsewidth at an initial pulsewidth less than the nominal minimum pulsewidth and monotonically increasing the Command Pulsewidth while monitoring combustion to detect the preliminary combustion event, as shown in FIG. 3, described hereinbelow. The Command Pulsewidth associated with the preliminary combustion event is considered a corrected nominal minimum pulsewidth for the set rail pressure, and the nominal minimum pulsewidth stored in the Injector Map is updated using the corrected nominal minimum pulsewidth (220).

FIG. 3 shows the plot of pilot fuel quantity in volume (mm$^3$) over time in seconds aligned with a graph of Indicated-Mean-Effective-Pressure (IMEP) over time in seconds and illustrates the detection of the onset of combustion with IMEP, which can be used to detect the preliminary combustion event. As previously discussed, a characteristically responsive change in IMEP corresponds to an injected fuel quantity of approximately 2.8 mm$^3$ for the embodiment shown, which is in direct relation to injector energizing time, i.e., pulsewidth. After updating the nominal minimum pulsewidth in the Injector Map for the set fuel rail pressure, supply pump 48 is controlled to set and maintain fuel rail pressure at another pre-determined level (208) and the injector command sweep process is repeated. Injector Map parameters are continuously updated through injector command sweeps during fuel cut-off mode. This iterative adaptation process is depicted in Eq. 1:

$$Q_k = aQ_{k-1} + (1-a)u_k \qquad [1]$$

wherein u is the detected parameter, e.g., IMEP, Q is the stored value (state), e.g., injector pulsewidth, and a is the learning rate.

Alternatively, the onset of combustion can be detected by employing a common mode rejection analysis between a fuel injected cylinder and a non-injected cylinder, the non-injected cylinder comprising a cylinder operating in fuel cut-off mode that is not charged with fuel. Common combustion characteristics can be identified between injected and non-injected cylinders and these characteristics can be cancelled from the fuel injection analysis to focus in-cylinder state of combustion on the combustion characteristics of the cylinders having injected fuel. During fuel cut-off mode the combustion parameter is monitored in an injected cylinder and a non-injected cylinder. Combustion characteristics of the two cylinders are compared and a baseline state of the combustion parameter is determined by eliminating characteristics common to both cylinders (214). The combustion parameter monitored in the injected cylinder is measured against the baseline combustion parameter. A baseline state of the combustion parameter can also be determined by skip-firing the injected cylinder. Skip-firing includes sequentially firing and non-firing an injector for the injected cylinder during sequential cylinder events and monitoring the in-cylinder combustion parameter. A delta measure of the combustion parameter can be derived and a baseline parameter determined. The results depicted in FIG. 3 show IMEP data for fueled and non-fueled cylinders, illustrating the differences and commonalities in the IMEP characteristics of each.

Figure 5:
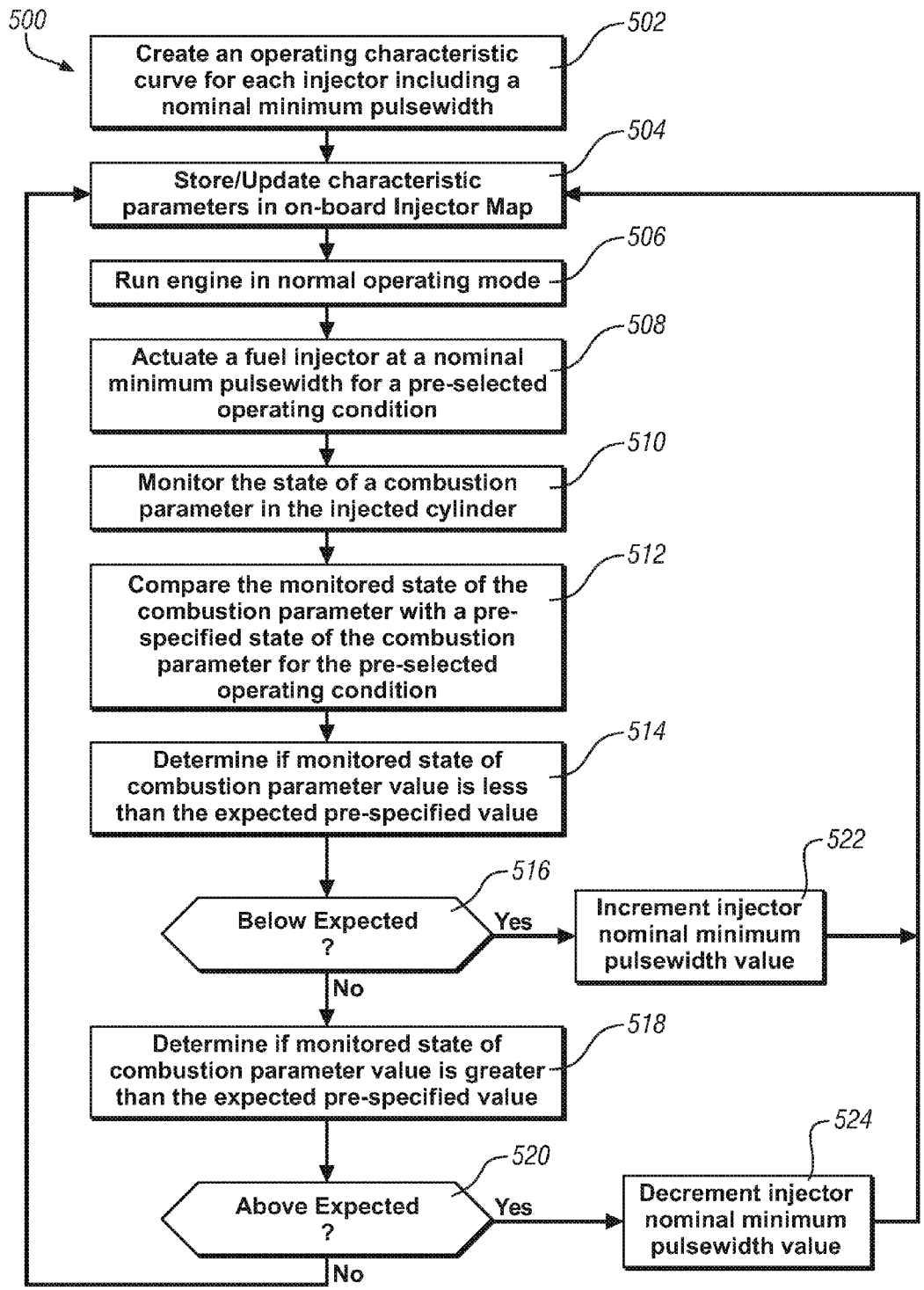
FIG. 5 is a flow diagram depicting a method for injector control and balancing through pilot detection during normal engine run mode in accordance with the present disclosure.
Figure 6:
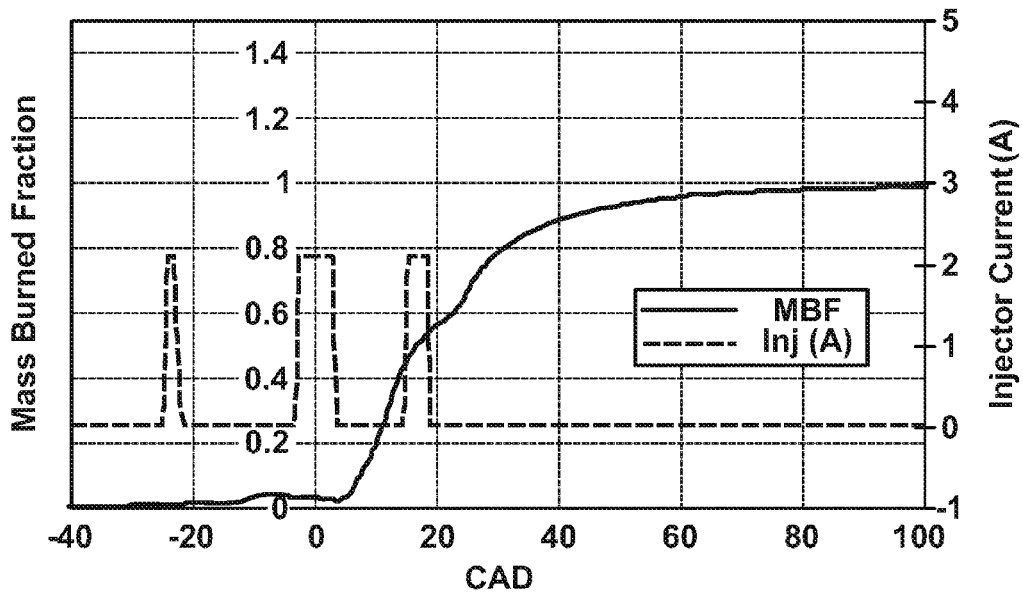
FIGS. 6 and 7 show data graph results illustrating the engine of FIG. 1 controlled according to the method of FIG. 5 in accordance with the present disclosure.

FIG. 5 shows a flowchart 500 of a second embodiment, comprising a non-intrusive operation to detect and control pilot injection events while the engine 10 is running during ongoing engine operation, with the fuel injectors 12 being utilized to fire the cylinders 20. Engine operating characteristics are pre-selected and injector parameters are pre-calibrated for a plurality of engine operating conditions, including a nominal minimum pulsewidth for each injector 12 and an energy threshold ('E-Threshold') that is expected to occur in each cylinder for each condition (502). The engine 10 operating characteristics are stored in the Injector Map (504). The engine 10 is in an ongoing operating mode (506). A first pre-determined engine operating condition for pilot injection is initiated for a first cylinder. The corresponding injector 12 is actuated at the pre-calibrated nominal minimum pulsewidth (508). A combustion parameter is monitored within the injected cylinder (510) and is compared with the corresponding pre-specified energy threshold for that combustion parameter that is stored in the Injector Map (512). If the energy release of the monitored combustion parameter is less than the expected pre-specified energy release of the combustion parameter then a missed pilot combustion is detected in the cylinder (514). If the energy release of the monitored combustion parameter is greater than the expected pre-specified energy release of the combustion parameter then an opportunity to optimize the nominal minimum pulsewidth is identified (518). One method to make this comparison is through Mass Burned Fraction (hereafter 'MBF') analysis. The MBF is a ratio of burned to un-burned fuel based on fuel mass. MBF is integrated in discrete-time through a time window wherein a start and end of the time window can be calibrated in accordance with the pilot injection timing and quantity. The formula to calculate the energy (combustion heat) released by the preliminary combustion event is computed from cylinder pressure as in Eq. 2:

$$E = \sum_{\theta_1}^{\theta_2} [MBF(\theta_k)] / (\theta_2 - \theta_1) \qquad [2]$$

wherein θ is crank angle ('CAD'), k is a crank angle index, preferably in one degree increments, $\theta_1$ is the starting crank angle and $\theta_2$ is the ending crank angle for the combustion event, $MBF(\theta_k)$ is the measured MBF for the crank angle, and E is the average MBF for the preliminary combustion event. A missing pilot injection event can be detected if the heat release contribution of the pilot injection event, i.e., E or energy, is found to be less than the pre-specified energy threshold, i.e., E<E-Threshold. A data graph of MBF and injector current (A) over crank angle is shown in FIG. 6 and depicts the effect of pilot injection on combustion heat release. Note after each pilot injection event, at approximately 10 degrees before top-dead-center, the MBF curve responds prior to the main combustion event.

Figure 7:
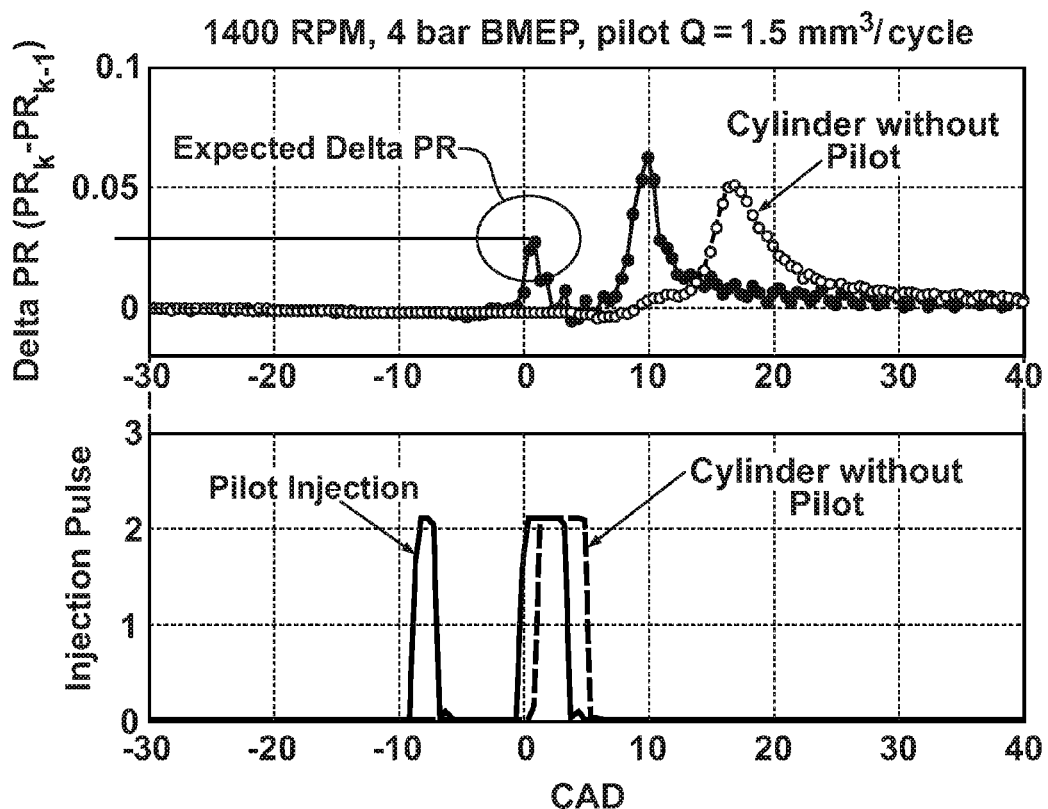
Figure 8:
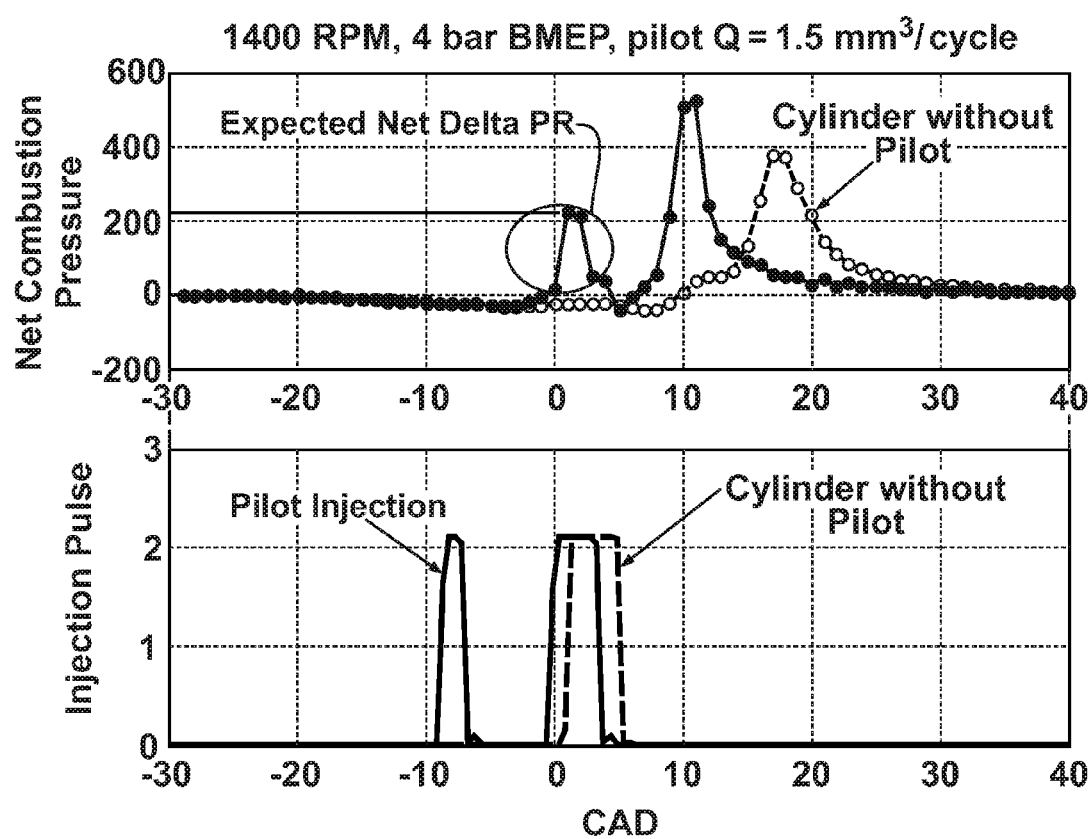
FIG. 8 shows data graph results illustrating the engine of FIG. 1 controlled according to the method of FIG. 5 in accordance with the present disclosure.

A missing pilot injection event can also be detected by monitoring pressure (hereafter 'Delta PR') within each cylinder 20. The pressure ratio ('PR') term is a ratio of in-cylinder pressure and an ideal in-cylinder motoring pressure. The Delta PR term is a crank angle-based derivative of the PR term, i.e., a change-rate of the pressure ratio term. FIG. 7 shows a graph of Injector Pulse over engine crank angle degrees (hereafter 'CAD') aligned with a graph of Delta PR over CAD for an engine operating at 1,400 RPM, 4 bar BMEP, pilot fuel Q=1.5 mm$^3$/cycle. This illustrates how the pilot injection can be identified by appearance of dual Delta PR peak components, while a non-piloted cylinder appears on the graph with a single Delta PR peak component. Similar graphical results for detection of pilot combustion are attained by choosing Net Combustion Pressure as the monitored combustion parameter. FIG. 8 shows a graph of Injector Pulse aligned with a graph of Net Combustion Pressure, both as a function of the engine crank angle for an engine operating at 1,400 RPM, 4 bar BMEP, pilot fuel Q=1.5 mm$^3$/cycle. This illustrates identifying the pilot injection by the appearance of dual Net Combustion Pressure peak components. A non-pilot injected cylinder appears on the graph with a single Net Combustion Pressure peak component. One having ordinary skill in the art will recognize that other pressure related energy measures such as Heat Release Rate ('HRR') may be employed in the pilot injection detection function.

If a missing pilot injection event is detected (516) the nominal minimum pulsewidth employed to actuate the injector 12 is incremented and the Injector Map is updated with the new pulsewidth value (522). If an onset of combustion is detected indicating a pilot injection event, and the monitored combustion parameter indicates the combustion heat release energy in the cylinder 20 is greater than the expected pre-specified energy threshold (520), then the nominal minimum pulsewidth is decremented and the Injector Map is updated with the new pulsewidth value (524). Consistency checks are continuously made for the cylinder 20 during normal operating mode to keep the nominal minimum pulsewidth for pilot injection at a minimum value. Identical cylinder monitoring is performed for each injector 12 on the engine 10. Targeting a common pre-specified energy threshold for each cylinder and adjusting injector pulsewidth values up or down until the monitored combustion energy release substantially matches the fixed energy threshold leads to overall injector balancing and improved engine performance.

Optionally, dithering the nominal minimum pulsewidth command during normal operating mode, or when an operating condition is re-visited, can be employed as a secondary measure to detect pilot injection events and performance. The nominal minimum pulsewidth command for the injector 12 can modified by adding a small dithering signal, preferably to decrease the injector pulsewidth. The combustion parameter for the associated cylinder is monitored to detect the presence and performance of the pilot injection event as described hereinabove. The nominal minimum pulsewidth command is repeatedly dithered to detect when the characteristically responsive state of the combustion parameter changes to an un-responsive state, indicating a missing pilot combustion event. When a missing pilot combustion event is detected an instantaneous increase in pilot fuel quantity is applied to prevent a complete missed pilot combustion event. The nominal minimum pulsewidth signal is re-calibrated to this corrected value and a safety margin energizing time is appended to the corrected value to ensure pilot combustion. The corresponding nominal minimum pulsewidth parameter in the Injector Map is updated.

This disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method to operate a direct-injection compression ignition multi-cylinder internal combustion engine, comprising:
    operating the engine under a predetermined condition comprising a fuel cut-off mode;
    controlling fuel pressure to a predetermined pressure level;
    actuating a fuel injector for a first cylinder during each cylinder event at pulsewidths adjusted from a nominal minimum pulsewidth and monitoring a combustion parameter for the first cylinder, wherein actuating the fuel injector for the first cylinder during each cylinder event at pulsewidths adjusted from the nominal minimum pulsewidth comprises,
        setting an initial pulsewidth less than the nominal minimum pulsewidth, and
        monotonically increasing the pulsewidth of the fuel injector for the first cylinder from the initial pulsewidth during successive cylinder events, wherein monotonically increasing the pulsewidth comprises increasing the pulsewidth during each successive cylinder event relative to the pulsewidth of the immediately preceding cylinder event;
    detecting a discernable change in the state of the combustion parameter in the first cylinder and determining a corresponding pulsewidth; and
    adjusting the nominal minimum pulsewidth to the pulsewidth corresponding to the discernable change in the state of the combustion parameter in the first cylinder.

2. The method of claim 1, wherein monitoring the combustion parameter for the first cylinder comprises determining a baseline state of the combustion parameter based upon a comparison of a state of the combustion parameter in the first cylinder and a state of the combustion parameter in a second cylinder when operating the engine in the fuel cut-off mode.

3. The method of claim 1, further comprising determining a baseline state of the combustion parameter based upon skip-firing the first cylinder and comparing the state of the combustion parameter during an injected cycle and a non-injected cycle when operating the engine in the fuel cut-off mode.

4. The method of claim 1, wherein monitoring the combustion parameter further comprises monitoring in-cylinder combustion pressure and determining an indicated-mean-effective-pressure for each combustion cycle.

5. The method of claim 1, wherein monitoring the combustion parameter further comprises monitoring in-cylinder combustion pressure and determining maximum pressure rise rate for each cylinder for each combustion cycle.

6. The method of claim 1, wherein adjusting the nominal minimum pulsewidth comprises overwriting a nominal minimum pulsewidth parameter in an onboard injector map with the pulsewidth corresponding to the discernable change in the state of the combustion parameter in the first cylinder.

7. A method to determine a preferred pilot injection pulsewidth for a direct-injection, multi-cylinder internal combustion engine, comprising:
    operating the engine under a predetermined condition;
    controlling fuel pressure to a predetermined pressure level;
    iteratively actuating a fuel injector for a first cylinder at pulsewidths adjusted from a nominal minimum pulsewidth, wherein actuating the fuel injector for the first cylinder at pulsewidths adjusted from the nominal minimum pulsewidth comprises, setting an initial pulsewidth less than the nominal minimum pulsewidth, and monotonically increasing the pulsewidth of the fuel injector for the first cylinder from the initial pulsewidth during successive cylinder events, wherein monotonically increasing the pulsewidth comprises increasing the pulsewidth during each successive cylinder event relative to the pulsewidth of the immediately preceding cylinder event monitoring combustion for the first cylinder;

detecting an onset of combustion in the first cylinder;

identifying a pulsewidth corresponding to the onset of combustion in the first cylinder; and adjusting the nominal minimum pulsewidth to the pulsewidth corresponding to the onset of combustion in the first cylinder.

8. The method of claim 7, further comprising detecting a minimum effective pulsewidth to deliver a sufficient mass of fuel to the combustion chamber to initiate a preliminary combustion event corresponding to the onset of combustion in the first cylinder.

* * * * *